US012604283B2

(12) United States Patent
Bellemare et al.

(10) Patent No.: US 12,604,283 B2
(45) Date of Patent: Apr. 14, 2026

(54) SYSTEMS, METHODS, AND TERMINALS FOR SYNCHRONIZATION OF SIGNAL TIMING BETWEEN A FIRST TERMINAL AND A SECOND TERMINAL

(71) Applicant: MacDonald, Dettwiler and Associates Corporation, Sainte-Anne-de-Bellevue (CA)

(72) Inventors: Michel Bellemare, Beaconsfield (CA); Jérôme Leclère, Montréal (CA)

(73) Assignee: MacDonald, Dettwiler and Associates Corporation, Sainte-Anne-de-Bellevue (CA)

( * ) Notice: Subject to any disclaimer, the term of this patent is extended or adjusted under 35 U.S.C. 154(b) by 0 days.

(21) Appl. No.: 18/718,836

(22) PCT Filed: Dec. 13, 2022

(86) PCT No.: PCT/CA2022/051816
§ 371 (c)(1),
(2) Date: Jun. 12, 2024

(87) PCT Pub. No.: WO2023/108270
PCT Pub. Date: Jun. 22, 2023

(65) Prior Publication Data
US 2025/0056436 A1     Feb. 13, 2025

Related U.S. Application Data

(60) Provisional application No. 63/290,498, filed on Dec. 16, 2021.

(51) Int. Cl.
| | |
|---|---|
| *H04W 56/00* | (2009.01) |
| *H04B 7/01* | (2006.01) |
| *H04B 7/06* | (2006.01) |

(52) U.S. Cl.
CPC ............ *H04W 56/001* (2013.01); *H04B 7/01* (2013.01); *H04B 7/0617* (2013.01)

(58) Field of Classification Search
CPC ........... H04W 56/001; H04W 56/0015; H04W 56/0025; H04W 56/002; H04B 7/01;
(Continued)

(56) References Cited

U.S. PATENT DOCUMENTS

| | | |
|---|---|---|
| 3,696,421 A | 10/1972 | Bitler |
| 3,898,388 A | 8/1975 | Goodwin |

(Continued)

FOREIGN PATENT DOCUMENTS

| | | |
|---|---|---|
| EP | 0934633 B1 | 8/1999 |
| EP | 1107597 A2 | 6/2001 |

(Continued)

OTHER PUBLICATIONS

International Search Report and Written Opinion for PCT International Patent Application No. PCT/CA2022/051816, issued Mar. 3, 2023.

(Continued)

*Primary Examiner* — Khanh C Tran
(74) *Attorney, Agent, or Firm* — Own Innovation; James W. Hinton; Kent C. Howe

(57) ABSTRACT

Systems, methods, and terminals for synchronization of signal timing between a first terminal and a second terminal are provided herein. The system and method includes transmitting a signal from a first terminal to a second terminal, the signal comprising a phase and a plurality of frames, receiving the signal at the second terminal, periodically inverting the phase of the signal at the frame interval to produce an inversion coded signal comprising at least one phase inversion point, transmitting the inversion coded signal from the second terminal to the first terminal, receiving the inversion (Continued)

coded signal at the first terminal, and determining transmission timing of the signal from the first terminal to the second terminal by measuring a timing discrepancy between the at least one phase inversion point and a start time of a next frame.

19 Claims, 7 Drawing Sheets

(58) Field of Classification Search
CPC .. H04B 7/0617; H04B 7/1851; H04B 7/2125; H04B 7/2126
See application file for complete search history.

(56) References Cited

U.S. PATENT DOCUMENTS

| | | | | |
|---|---|---|---|---|
| 4,215,348 | A * | 7/1980 | Cordaro | H04L 7/0012 |
| | | | | 370/324 |
| 5,966,376 | A | 10/1999 | Rakib et al. | |
| 6,389,088 | B1 | 5/2002 | Blois et al. | |
| 6,590,881 | B1 | 7/2003 | Wallace et al. | |
| 6,870,819 | B1 * | 3/2005 | Potier | H04B 7/2125 |
| | | | | 370/324 |
| 7,327,699 | B1 * | 2/2008 | Schafer | G04R 20/02 |
| | | | | 370/324 |
| 2003/0214434 | A1 * | 11/2003 | Gronemeyer | G01S 19/29 |
| | | | | 342/378 |
| 2005/0013284 | A1 | 1/2005 | Proctor | |
| 2005/0276250 | A1 | 12/2005 | Grieco et al. | |
| 2011/0304502 | A1 * | 12/2011 | Chen | G08G 3/02 |
| | | | | 342/352 |
| 2014/0253200 | A1 | 9/2014 | Gunn | |
| 2016/0219544 | A1 | 7/2016 | Park | |
| 2020/0186220 | A1 | 6/2020 | Freedman et al. | |

FOREIGN PATENT DOCUMENTS

| | | | |
|---|---|---|---|
| JP | 4952607 | B2 | 6/2012 |
| KR | 960015849 | B1 | 11/1996 |
| WO | 2021062540 | A1 | 4/2021 |
| WO | 2021113979 | A1 | 6/2021 |

OTHER PUBLICATIONS

Extended European Search Report for 22905574.4 dated Oct. 23, 2025.

* cited by examiner

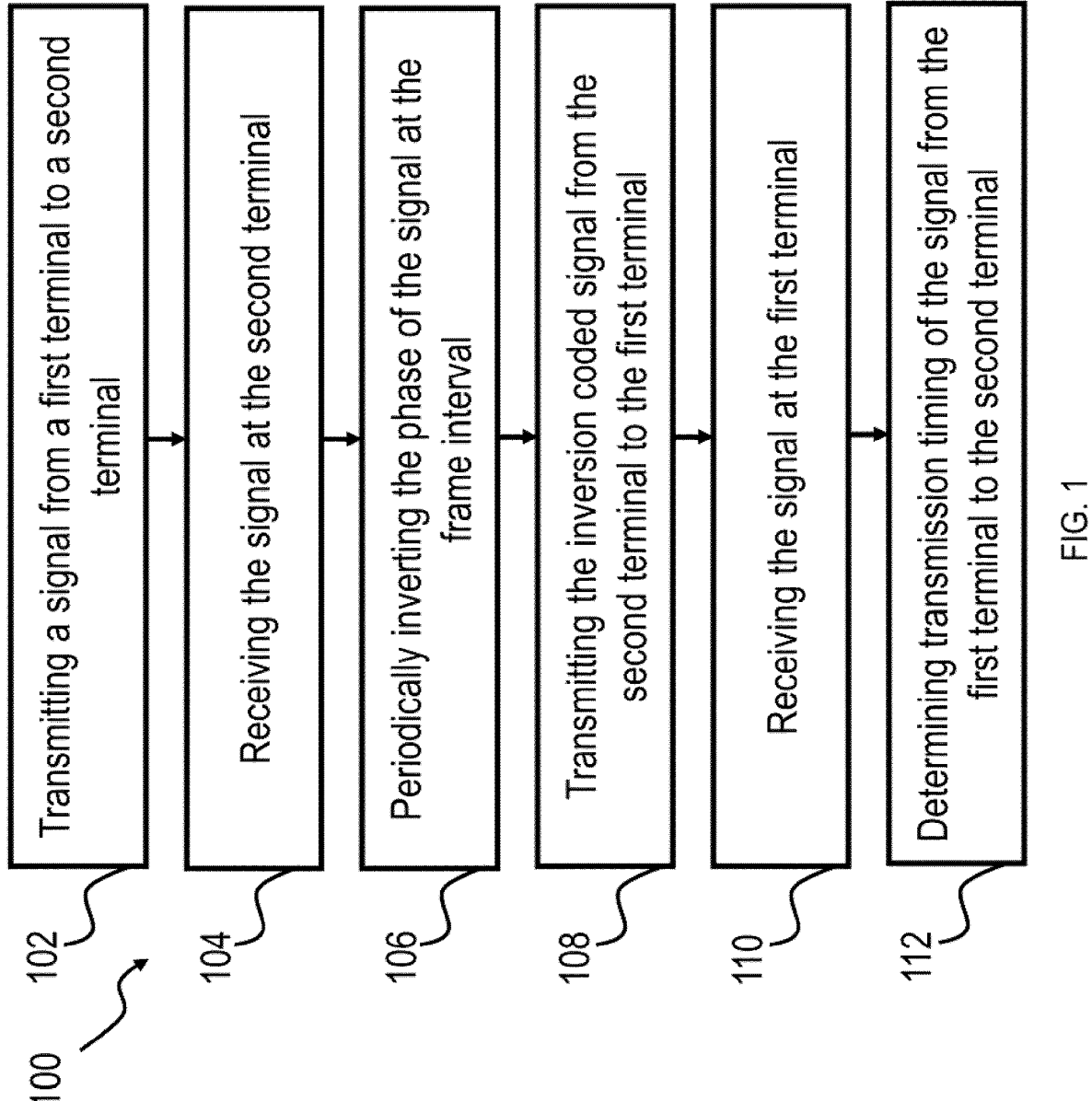

102 Transmitting a signal from a first terminal to a second terminal

104 Receiving the signal at the second terminal

106 Periodically inverting the phase of the signal at the frame interval

108 Transmitting the inversion coded signal from the second terminal to the first terminal 110 Receiving the signal at the first terminal 112 Determining transmission timing of the signal from the first terminal to the second terminal

1

SYSTEMS, METHODS, AND TERMINALS FOR SYNCHRONIZATION OF SIGNAL TIMING BETWEEN A FIRST TERMINAL AND A SECOND TERMINAL

TECHNICAL FIELD

The following relates generally to wireless communication systems, and more particularly to systems, methods, and terminals for synchronizing signal timing between a first terminal and a second terminal.

INTRODUCTION

When transferring a wireless signal between two terminals, it may be advantageous to synchronize both terminals. For example, synchronization of the terminals may be performed to synchronize the two terminals prior to a calibration of one of the terminals.

Communication systems may employ a number of signal synchronization techniques. For example, existing synchronization techniques may be based on existing preambles, packet counters, or dedicated pilots within the main airlink waveform. However, common synchronization methods may require specialized hardware in one or both terminals and may negatively impact data transmission rates.

Accordingly, there is a need for an improved system and method for synchronizing signal timing between two terminals that overcomes at least some of the disadvantages of existing systems and methods.

SUMMARY

According to an embodiment, provided herein is a system for synchronizing signal timing of a radio frequency (RF) signal comprising a phase and a plurality of frames. The system comprises a first terminal comprising a signal analyzing module, a second terminal on an orbiting satellite, the second terminal including a clock, a phase inversion module, and a direct radiating array, the clock outputting a clock signal at a frame interval, wherein the first terminal is configured to transmit the signal to the second terminal, wherein the second terminal is configured to receive the signal transmitted from the first terminal, periodically invert the phase of the signal at the clock frame interval using the phase inversion module to produce an inversion coded signal comprising at least one phase inversion point, and transmit the inversion coded signal to the first terminal using the direct radiating array and wherein the first terminal is configured to receive the inversion coded signal and determine signal transmission timing by measuring a discrepancy between a phase inversion point and a beginning point of a next frame using the signal analyzing module.

According to some embodiments, the direct radiating array is configured to perform analog beamforming and wherein the phase inversion module is configured to periodically invert the phase of the signal at the frame interval by adjusting beamforming weights of an analog beamforming network in the direct radiating array by 180 degrees using a phase shift.

According to some embodiments, the direct radiating array includes an analog beamformer, and wherein the phase inversion module is configured to periodically invert the phase of the signal at the frame interval by adjusting beamforming weights in the analog beamformer by 180 degrees via an analog phase shifter.

According to some embodiments, the direct radiating array is configured to perform digital beamforming and wherein the phase inversion module is configured to periodically invert the phase of the signal at the frame interval by digitally adjusting beamforming weights of a digital beamforming network in the direct radiating array by 180 degrees using a phase shift.

According to some embodiments, the direct radiating array includes a digital beamformer, and wherein the phase inversion module is configured to periodically invert the phase of the signal at the frame interval by adjusting beamforming weights in the digital beamformer by 180 degrees via a digital phase shifter.

According to some embodiments, the first terminal is further configured to transmit an adjusted signal to the second terminal, the adjusted signal being the signal with a timing adjustment applied, and wherein the timing adjustment is determined from the transmission timing of the signal.

According to some embodiments, the timing adjustment comprises delaying the transmission of the signal by an amount of time equal to the signal transmission timing.

According to some embodiments, each frame of the signal comprises a length, and wherein the length is equal to the frame interval.

According to some embodiments, the signal is transmitted from the first terminal to the second terminal for a duration of time such that at least two full frames are transmitted before transmitting an adjusted signal.

According to some embodiments, the system further comprises determining a Doppler shift between the signal and inversion coded signal and applying a Doppler adjustment factor to the adjusted signal based on the Doppler shift determination.

According to an embodiment, provided herein is a method of synchronizing signal timing between a first terminal and a second terminal, wherein the second terminal comprises a clock, the clock outputting a clock signal at a frame interval. The method comprises transmitting a signal from the first terminal to the second terminal, the signal comprising a phase and a plurality of frames, receiving the signal at the second terminal, periodically inverting the phase of the signal at the frame interval to produce an inversion coded signal comprising at least one phase inversion point, transmitting the inversion coded signal from the second terminal to the first terminal, receiving the inversion coded signal at the first terminal, determining transmission timing of the signal from the first terminal to the second terminal by measuring a timing discrepancy between the at least one phase inversion point and a start time of a next frame.

According to some embodiments, the method further comprises transmitting an adjusted signal from the first terminal to the second terminal, the adjusted signal being the signal with a timing adjustment applied, and wherein the timing adjustment is determined from the transmission timing of the signal.

According to some embodiments, the timing adjustment comprises delaying the transmission of the signal by an amount of time equal to the signal transmission timing.

According to some embodiments, each frame of the signal comprises a length, and wherein the length is equal to frame interval.

According to some embodiments, the signal is a radio frequency ("RF") signal.

According to some embodiments, the second terminal is on an orbiting satellite.

According to some embodiments, the signal is transmitted from the first terminal to the second terminal for a duration of time such that at least two full frames are transmitted before transmitting an adjusted signal.

According to some embodiments, the method further comprises determining a Doppler shift between the signal and inversion coded signal and applying a Doppler adjustment factor to the signal based on the Doppler shift determination.

According to an embodiment, disclosed is a system for synchronizing signal timing of a signal comprising a phase and a plurality of frames. The system comprises a first terminal, comprising a signal analyzing module, a second terminal comprising a clock and a phase inversion module, the clock outputting a clock signal at a frame interval, wherein the first terminal is configured to transmit the signal to the second terminal, wherein the second terminal is configured to receive the signal transmitted from the first terminal, periodically invert the phase of the signal at the frame interval using the phase inversion module to produce an inversion coded signal comprising at least one phase inversion point, and transmit the inversion coded signal to the first terminal, and wherein the first terminal is configured to receive the inversion coded signal and determine signal transmission timing by measuring a discrepancy between the at least one phase inversion point and a beginning point of a next frame using the signal analyzing module.

According to some embodiments, the first terminal is further configured to transmit an adjusted signal to the second terminal, the adjusted signal being the signal with a timing adjustment applied, and wherein the timing adjustment is determined from the transmission timing of the signal.

According to some embodiments, the timing adjustment comprises delaying the transmission of the signal by an amount of time equal to the signal transmission timing.

According to some embodiments, each frame comprises a length, and wherein the length is equal to the frame interval.

According to some embodiments, the signal is a radio frequency ("RF") signal.

According to some embodiments, the second terminal is on an orbiting satellite.

According to some embodiments, the signal is transmitted from the first terminal to the second terminal for a duration of time such that at least two full frames are transmitted before transmitting the adjusted signal.

According to some embodiments, the first terminal comprises a Doppler estimation module configured to determine a Doppler shift between the signal and inversion coded signal and apply a Doppler adjustment factor to the adjusted signal based on the determined Doppler shift.

According to an embodiment, provided herein is a method of operating a wireless communication system for transmitting a signal between a first terminal and a second terminal, the signal comprising a phase and a plurality of frames, the second terminal comprising a clock, the clock outputting a clock signal at a frame interval, the method comprising synchronizing the first terminal and the second terminal, the synchronizing comprising transmitting the signal from the first terminal to the second terminal for a fixed period of time, receiving the signal at the second terminal, periodically inverting the phase of the signal at the frame interval to produce an inversion coded signal comprising at least one phase inversion point, transmitting the inversion coded signal from the second terminal to the first terminal, receiving the inversion coded signal at the first terminal, determining transmission timing of the signal from the first terminal to the second terminal by measuring a timing discrepancy between a phase inversion point and a start time of a next frame, and transmitting an adjusted signal from the first terminal to the second terminal, the adjusted signal being the signal with a timing adjustment applied, wherein the timing adjustment is determined from the transmission timing of the signal, and wherein the adjusted signal is received by the second terminal such that each frame is aligned with the frame interval of the second terminal.

According to some embodiments, the transmission of the signal is part of a calibration process through which the second terminal is being calibrated.

According to some embodiments, each frame of the signal comprises a length, and wherein the length is equal to the frame interval.

According to some embodiments, the signal is a radio frequency ("RF") signal.

According to some embodiments, the second terminal is on an orbiting satellite.

According to some embodiments, the signal is transmitted from the first terminal to the second terminal for a duration of time such that at least two full frames are transmitted before transmitting the adjusted signal.

According to some embodiments, the method further comprises determining a Doppler shift between the signal and inversion coded signal and applying a Doppler adjustment factor to the adjusted signal based on the Doppler shift determination.

According to an embodiment, provided herein is a first terminal for synchronizing wireless communications with a second terminal, the first terminal comprising a transmit unit for transmitting a wireless radio frequency ("RF") signal to the second terminal, the signal including a phase and a plurality of frames, a receive unit for receiving a wireless RF inversion coded signal from the second terminal, the inversion coded signal generated from the signal by the second terminal by applying a phase inversion to the signal, a signal analyzing module configured to determine signal transmission timing by measuring a discrepancy between a phase inversion point in the inversion coded signal and a beginning point of a next frame of the inversion coded signal and synchronize signal timing of the signal to the second terminal.

According to some embodiments, the first terminal is configured to transmit an adjusted signal to the second terminal, wherein the adjusted signal comprises the signal with transmission timing of the signal delayed by the signal transmission timing.

According to some embodiments, each frame comprises a length, and wherein the length is equal to the frame interval.

According to some embodiments, the signal is transmitted from the first terminal to the second terminal for a duration of time such that at least two full frames are transmitted before transmitted the adjusted signal.

According to some embodiments, the first terminal comprises a Doppler estimation module configured to determine a Doppler shift between the signal and inversion coded signal and apply a Doppler adjustment factor to the adjusted signal based on the determined Doppler shift.

According an embodiment, provided herein is a method applied in a first terminal of synchronizing signal timing between the first terminal and a second terminal, the second terminal comprising a clock, the clock outputting a clock signal at a frame interval, the method comprising transmitting a signal to the second terminal, the signal comprising a phase and a plurality of frames, receiving an inversion coded signal from the second terminal, the inversion coded signal generated by periodically inverting the phase of the signal at the frame interval and determining transmission timing of the signal from the first terminal to the second terminal by measuring a timing discrepancy between a phase inversion point in the inversion coded signal and a start time of a next frame.

According to some embodiments, the method further comprises transmitting an adjusted signal from the first terminal to the second terminal, the adjusted signal being the signal with a timing adjustment applied, wherein the timing adjustment is determined from the transmission timing of the signal.

According to some embodiments, the timing adjustment comprises delaying the transmission of the signal by an amount of time equal to the signal transmission timing.

According to some embodiments, each frame of the signal comprises a length, and wherein the length is equal to the frame interval.

According to some embodiments, the signal is a radio frequency ("RF") signal.

According to some embodiments, the second terminal is on an orbiting satellite.

According to some embodiments, the signal is transmitted from the first terminal to the second terminal for a duration of time such that at least two full frames are transmitted before transmitting the adjusted signal.

According to some embodiments, the method further comprises determining a Doppler shift between the signal and the inversion coded signal and applying a Doppler adjustment factor to the adjusted signal based on the Doppler shift determination.

According to an embodiment, provided herein is a method, applied in a second terminal, of synchronizing signal timing between a first terminal and the second terminal, the second terminal comprising a clock, the clock outputting a clock signal at a frame interval, the method comprising receiving a signal comprising a phase and plurality of frames at the second terminal, periodically inverting the phase of the signal at the frame interval to produce an inversion coded signal comprising at least one phase inversion point and transmitting the inversion coded signal from the second terminal to the first terminal.

According to some embodiments, each frame of the signal comprises a length, and wherein the length is equal to the frame interval.

According to some embodiments, the signal is a radio frequency ("RF") signal.

According to some embodiments, the second terminal is on an orbiting satellite.

According to some embodiments, transmitting the inversion coded signal from the second terminal to the first terminal comprises a signal loopback operation.

According to an embodiment, provided herein is a second terminal for synchronizing wireless communications with a first terminal, the second terminal comprising a receive unit for receiving a signal comprising a phase and plurality of frames from the first terminal, a clock, the clock outputting a clock signal at a frame interval, a phase inversion module, configured to periodically invert the phase of the signal at the frame interval to produce an inversion coded signal comprising at least one phase inversion point and a transmit unit for transmitting the inversion coded signal to the first terminal.

According to some embodiments, each frame comprises a length, and wherein the length is equal to the frame interval.

According to some embodiments, the signal is a radio frequency ("RF") signal.

According to some embodiments, receiving the signal and transmitting the inversion coded signal collectively comprises a loopback operation.

According to an embodiment, provided herein is a method of signal synchronization between two communication terminals configured for wireless communication. The method includes transmitting a signal from a first terminal to a second terminal, performing a phase inversion of the signal at clock timing points of the second terminal such that timing information is encoded into the signal at phase inversion points to generate a timing encoded signal, transmitting the timing encoded signal to the first terminal, extracting second terminal timing information from the received timing encoded signal using phase inversion points in the timing encoded signal, and synchronizing communication between the first and second terminals using the extracted second terminal timing information.

According to an embodiment, provided herein is a system for synchronizing signal timing of a signal comprising a phase and a plurality of frames. The system includes a first terminal, comprising a signal analyzing module, a second terminal comprising a clock and an amplitude coding module, the clock outputting a clock signal at a frame interval, wherein the first terminal is configured to transmit the signal to the second terminal, wherein the second terminal is configured to receive the signal transmitted from the first terminal, periodically alter the amplitude of the signal at the frame interval using the amplitude coding module to produce an amplitude coded signal comprising at least one amplitude step discontinuity, and transmit the amplitude coded signal to the first terminal, and wherein the first terminal is configured to receive the amplitude coded signal and determine signal transmission timing by measuring a discrepancy between the at least one amplitude step discontinuity and a beginning point of a next frame using the signal analyzing module.

According to some embodiments, the first terminal is further configured to transmit an adjusted signal to the second terminal, the adjusted signal being the signal with a timing adjustment applied, and wherein the timing adjustment is determined from the transmission timing of the signal.

According to some embodiments, the timing adjustment comprises delaying the transmission of the signal by an amount of time equal to the signal transmission timing.

According to some embodiments, each frame comprises a length, and wherein the length is equal to the frame interval.

According to some embodiments, signal is a radio frequency ("RF") signal.

According to some embodiments, the second terminal is on an orbiting satellite.

According to some embodiments, the signal is transmitted from the first terminal to the second terminal for a duration of time such that at least two full frames are transmitted before transmitting the adjusted signal.

According to some embodiments, the first terminal comprises a Doppler estimation module configured to determine a Doppler shift between the signal and amplitude coded signal and apply a Doppler adjustment factor to the adjusted signal based on the determined Doppler shift.

According to an embodiment, provided herein is a method of synchronizing signal timing between a first terminal and a second terminal, wherein the second terminal comprises a clock, the clock outputting a clock signal at a frame interval. The method includes transmitting a signal from the first terminal to the second terminal, the signal comprising a phase and a plurality of frames, receiving the signal at the second terminal, periodically altering by the second terminal the amplitude of the signal at the frame interval to produce an amplitude coded signal comprising at least one amplitude step discontinuity, transmitting the amplitude coded signal from the second terminal to the first terminal, receiving the amplitude coded signal at the first terminal, determining transmission timing of the signal from the first terminal to the second terminal by measuring a timing discrepancy between the at least one amplitude step discontinuity and a start time of a next frame.

According to some embodiments, the method further includes transmitting an adjusted signal from the first terminal to the second terminal, the adjusted signal being the signal with a timing adjustment applied, and wherein the timing adjustment is determined from the transmission timing of the signal.

According to some embodiments, the timing adjustment comprises delaying the transmission of the signal by an amount of time equal to the signal transmission timing.

According to some embodiments, each frame of the signal comprises a length, and wherein the length is equal to the frame interval.

According to some embodiments, the signal is a radio frequency ("RF") signal.

According to some embodiments, the second terminal is on an orbiting satellite.

According to some embodiments, the signal is transmitted from the first terminal to the second terminal for a duration of time such that at least two full frames are transmitted before transmitting an adjusted signal.

According to some embodiments, the method further includes determining a Doppler shift between the signal and amplitude coded signal and applying a Doppler adjustment factor to the signal based on the Doppler shift determination.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 1 is a flowchart of a method of synchronizing a signal between a first terminal and a second terminal, according to an embodiment;

DETAILED DESCRIPTION

Figure 2:
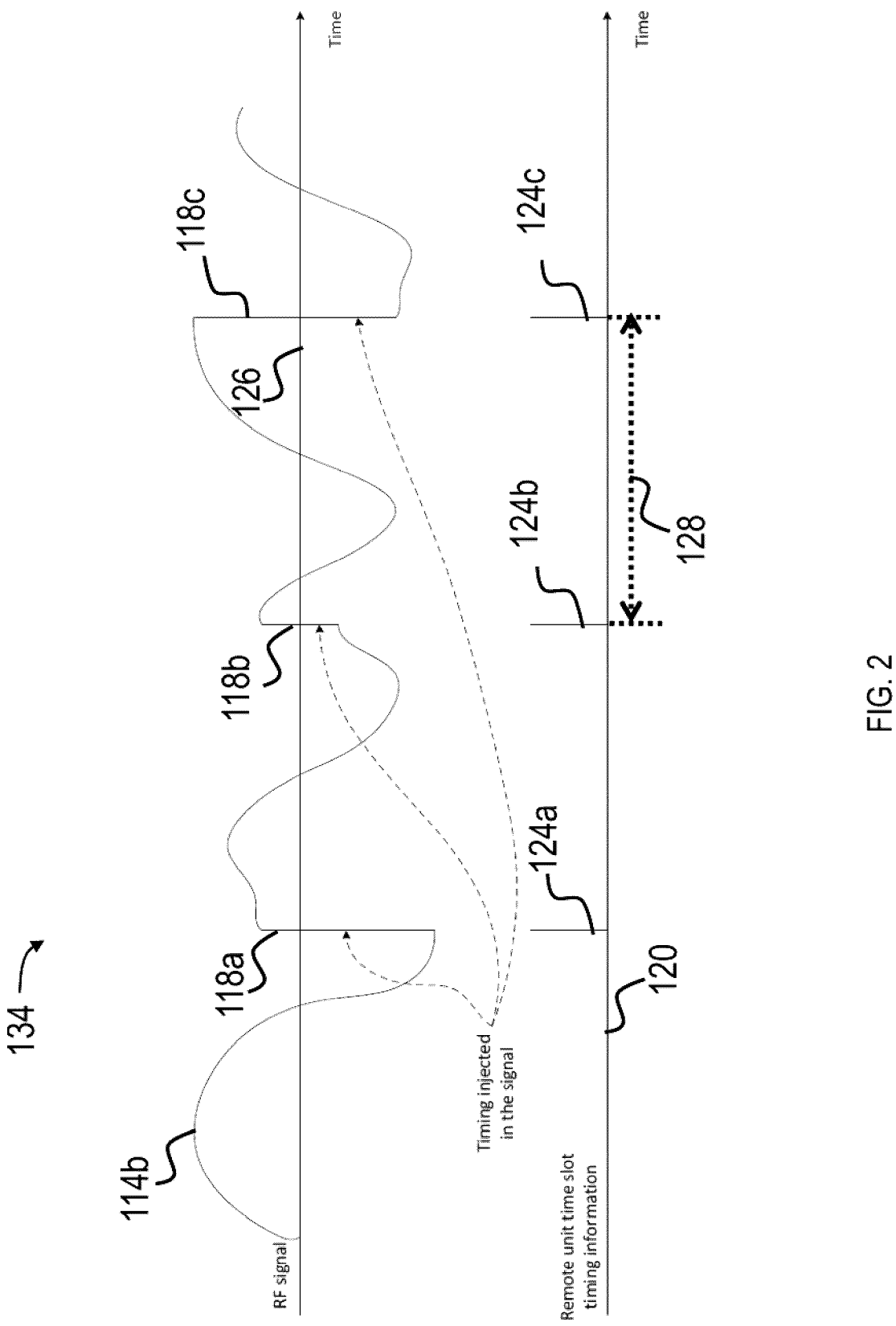
FIG. 2 is a graph depicting an example inversion coded signal generated by the method of FIG. 1, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to methods for improving wireless communication, and more particularly to methods and systems for signal synchronization between a first terminal and a second terminal.

While the present disclosure makes reference to phase "inversion", it is to be understood and will be clear from the present disclosure that the systems and methods described herein are not limited to phase shifts of 180 degrees, though such 180 degree phase shifts may be preferred, and other phase shifts are contemplated. Accordingly, reference in the present disclosure to "phase inversion" should be understood to include phase shifts of 180 degrees as well as phase shifts other than 180 degrees.

While the present disclosure makes reference to a signal "frame" or "frames", frame is intended to refer generally to a discrete subcomponent of a signal. For example, some signal schemes may comprise a hierarchy of discrete signal subcomponents. In some examples, such a hierarchy may comprise, from smallest to largest, bits/symbols, time slots (TS), sub-frames, frames, and super-frames. In other examples, a signal may comprise another hierarchy. In the present disclosure, frame may refer to these other signal subcomponents, such as timeslots or sub-frames. In some cases, subcomponents may be referred to as lower order frames and higher order frames, or some variation thereof, to distinguish smaller and larger subcomponents (each being "frames", in the general sense) in the hierarchy. In some examples, a single frame may comprise 480 signal time slots.

The systems and methods of the present disclosure may be used to synchronize the second terminal, such as a satellite, and the first terminal, such as a satellite calibration station, prior to performing calibration of the second terminal. Example calibration may be performed as described in PCT Publication No. WO2021/113979 A1.

Timing and carrier synchronization is a fundamental requirement for any wireless communication system. Timing synchronization is the process by which a receiver node determines the correct instants of time at which to sample the incoming signal.

Signal synchronization is the necessary process of aligning the symbols or bits that are to be sampled such that the receiving terminal may retrieve the correct information from the received signal. Carrier synchronization is the process by which a receiver adapts the frequency and phase of its local carrier oscillator with those of the received signal.

For proper function, the receiver needs to be synchronized with the incoming signal. Synchronization is a necessary process for many communication systems before commencing regular transmission. Synchronization may be performed prior to establishing standard communications, and after ranging, such that the system may establish information bit frame boundaries.

Similarly, calibration and ranging may be performed before commencing regular transmission. Calibration comprises evaluating and correcting inherent errors present in a second terminal, if necessary. Ranging comprises measuring distances between two terminals.

Once synchronization has been established, standard, synchronized communications can commence and be maintained.

The accuracy of the synchronization will determine whether the communication system is able to perform well. The receiver needs to determine at which time instants the incoming signal has to be sampled (timing synchronization). In addition, for bandpass communications, the receiver needs to adapt the frequency and phase of its local carrier oscillator with those of the received signal (carrier synchronization). However, most of the existing communication systems operate under hostile conditions: low SNR, strong fading, and (multiuser) interference, which makes the acquisition of the synchronization parameters burdensome. Therefore, synchronization is considered, in general, as a challenging task.

In the systems and methods of the present disclosure, a communication signal may be transmitted from a first terminal to a second terminal. In an embodiment, the first terminal may be a base terminal, such as a calibration terminal, and the second terminal may be a remote terminal, such as on a satellite. For example, such a signal may take the form of a radio frequency ("RF") signal, which is generated by the first terminal, transmitted to, and received by, the second terminal. Such signals may comprise a plurality of frames, generally of fixed length, or of a length that is an integer multiple of a base length. Once received by the second terminal, without synchronization, the frames of the transmitted signal are likely to not be aligned with the frame timing of the second terminal, which may be fixed according to an internal clock of the second terminal. The second terminal may perform a phase inversion (or other detectable phase shift) of the received signal at each point corresponding to the second terminal's frame timing, resulting in an inversion coded signal, wherein the remote frame timing is encoded directly into the original signal. The second terminal may then loop this inversion coded signal back to the first terminal, by transmitting the signal back to the first terminal along an RF wireless channel. When the inversion coded signal is received by the first terminal, the first terminal may perform an analysis to determine transmission timing between the first terminal and second terminal by measuring the time difference between frame start points and signal phase inversion points. The first terminal may introduce a transmission delay equal to the length of transmission time, such that when a signal is transmitted from the first terminal to the second terminal, the signal is received by the second terminal such that signal frames are temporally aligned with the second terminal frame timing, synchronizing the signal transmission between the first terminal and second terminal. The first and second terminal may now commence a standard airlink, wherein data is transmitted between terminals. The standard airlink is time synchronized between terminals. The synchronization method described herein may synchronize terminals to within 1 microsecond precision.

The system and method disclosed herein provides a method of signal synchronization that is airlink agnostic, as the method and system only require a dedicated time period to perform initial synchronization prior to standard synchronized airlink transmission, and do not rely on a specific and or existing modulation or coding scheme. Additionally, the system and method is highly tolerant to noise and interference by employing a pseudorandom number (PRN) code with high processing gain and sensitivity to phase shift, and may be applied to a variety of systems, as long as each second terminal supports signal loopback and phase inversion. The method described herein has performed at approximately 0 dB SNR in previously performed simulations. In an embodiment, a second terminal performs a loopback of the signal while changing the signal phase by 180 degrees. In the systems and methods described herein, all synchronization occurs at the first terminal, and the complexity (i.e. measuring, detecting and computing) is contained within the first terminal. The systems and methods of the present disclosure advantageously provide a wireless communications system synchronization technique that is independent and decoupled from a normal airlink used in a system. The present disclosure provides systems and methods for performing RF signal inversion to embed second (remote) terminal frame synchronization in the signal itself.

The synchronization method and system described herein requires no synchronization preamble, synchronization bits, or time counter. The synchronization system and method utilizes only a simple waveform where the timing is imprinted in the signal itself. Thus, it is completely independent of the existing waveform/airlink. This is in contrast to other existing synchronization techniques which may be based on existing synchronization preambles, packet counters, or dedicated pilots within the main airlink waveform.

The method and system described herein may be applied to both static and moving terminals.

A wireless communications system that has multiple modes of operation may need different synchronization schemes. The systems and methods of the present disclosure may advantageously be implemented in all modes of all systems with some minimal requirements. For example, a satellite communications system may comprise several independent systems sharing only power. The systems and methods of the present disclosure may be implemented for all independent systems of the satellite with some minimal constraints. Alternatively, the system and methods of the present disclosure can be implemented as the main timing acquisition and ranging method for any airlink.

The systems and methods of the present disclosure may be implemented as a timing acquisition and ranging method for any airlink.

The system and method disclosed herein may be applied to IoT timing synchronization, remote clock synchronization and TDMA systems. For example, the synchronization systems and methods may be used in an IoT system where a device is trying to probe an IoT device and there is a need to synchronize with the IoT device.

Referring first to FIG. 1, pictured therein is a flow chart detailing a method 100 of synchronizing a signal between a first terminal and a second terminal, according to an embodiment. The signal may be a pseudorandom number (PRN) coded signal. In some examples, the signal may be a PRN coded direct-sequence spread spectrum (DSSS) signal. Other methods may be employed. For example, other continuous, un-coded signals may be employed. It may be particularly advantageous if methods or schemes comprising favorable autocorrelation properties are employed.

The first and second terminals may be any terminals capable of performing wireless communication and for which synchronization between the first and second terminals is desirable. In some examples, the first terminal may be specially configured to perform calibration tasks for calibrating other terminals, such as the second terminal, and the second terminal may be a remote terminal for which calibration of its wireless communication system components is needed or desired.

At 102, a signal is transmitted from a first terminal to a second terminal. The signal may be any signal in the art which can carry information. For example, the signal may be a radio frequency ("RF") signal, an IR signal, a visible light signal, sound signal, or any other signal known in the art. In an embodiment, the signal is a PRN coded DSSS signal.

The carrier of the signal is an analog signal. In some examples, the signal may be a digitally modulated signal, modulated with a PRN code. In some examples, the signal includes a phase and a plurality of frames. In the case of a periodic RF signal, the phase may be defined as the positive or negative phase state of the signal, relative to a reference point. Frames may be defined as a repeating structure contained within the signal, each frame comprising a set of information. Frames may comprise a header or other metadata. Each frame may be of a fixed length, which may be measured by the time interval between one frame and the next frame. In other examples, frames may be of variable length.

In examples wherein the signal comprises an RF signal, the signal may be carried on any operational carrier frequency. The RF signal may be modulated by any modulation scheme known in the art. In an embodiment, the modulation scheme may comprise phase modulation. Particularly, the modulation scheme may comprise binary phase shift keying. Binary phase shift keying may be specifically well suited for the systems and methods described herein, as a complex correlation may be performed directly on the modulated signal, without an intermediate bit decoding operation. In other examples, other modulation schemes may be employed. This includes, but is not limited to, amplitude modulation, frequency modulation, quadrature amplitude modulation, quadrature phase shift keying, frequency shift keying, phase shift keying, direct sequence spread spectrum or any modulation scheme.

The first terminal and second terminal may be any terminals which may send and receive information signals to one another to communicate in some manner. For example, the first terminal and second terminal may each be a device comprising a RF transmitter and an RF receiver, wherein each terminal is configured such that they may send and receive RF signals to and from the other terminal. In some examples, the first terminal and second terminal may each be a light transmitter and photodiode pair, wherein each terminal is configured to send and receive a light signal to and from the other terminal.

In some examples, one terminal may be stationary, while the other terminal may be mobile. For example, the first terminal may be a fixed ground terminal, while the second terminal may be an orbiting satellite. In other examples, both terminals may be mobile, for example, each terminal may be a smartphone, or each terminal may be an earth orbiting satellite. In some examples, the first or second terminal may be a subcomponent of an object such as a satellite or a terrestrial communication station.

The second terminal may comprise a clock. The clock may be any type of clock known in the art that may keep time at a suitable precision. In some examples, the clock may be a piezoelectrically driven clock, such as a quartz oscillator. In other examples, the clock may be an atomic clock. In other examples, the clock may be an externally driven clock, wherein the clock receives a time signal from an external device, such as a global positioning system transmitter. The system described herein may align the local and remote clocks of the first and second terminals, accounting for all delay in the system.

In some examples, the signal may be transmitted from the first terminal to the second terminal along a wireless channel.

The clock of the second terminal outputs a clock signal at a frame interval. The frame interval may be a fraction of the raw clock frequency of the clock. The clock signal may be any signal that may be detected by another component. In some examples, the frame interval may be permanently fixed by the hardware configuration of the second terminal. In other examples, the frame interval may be varied by adjusting the software and or hardware configuration of the second terminal.

At 104, the signal is received at the second terminal. A duration of time may be required between step 102 and step 104 for the signal to transmit from the first terminal to the second terminal. The exact duration of time required for the signal to travel from the first terminal to the second terminal may be unknown. In some examples the modulated, and or multiplexed RF signal, comprises a plurality of sequential frames, each frame having a frame beginning and frame end. The signal may be received at the second terminal such that the time position of each frame beginning, and end is unknown. The second terminal may be configured to receive a signal with a fixed frame length, such that each received frame begins and ends at points corresponding to frame interval points. Unless the second terminal and first terminal are specifically synchronized, it is unlikely that the frames of the received signal are temporally aligned with the frame interval points.

Referring now to both FIG. 1 and FIG. 2, at 106, the signal phase is periodically inverted at each frame interval point. The phase may be inverted 180 degrees. In some embodiments, 180 degree phase inversion may provide the most robustness against noise. In other embodiments, a different phase inversion or shift may be performed. For example, a 45 degree phase shift, or 90 degree phase shift may be performed. In some examples, 180 phase shifts/inversions may correspond to the greatest level of performance and robustness against noise, with robustness decreasing as the degree of phase shift moves away from 180 degrees. Nevertheless, embodiments performing phase shifts other than 180 degrees may be used, for example, where the reduction in performance and robustness to noise and level of degradation is deemed acceptable. A phase inversion module of the second terminal may receive both the clock signal on a clock voltage line and the received signal transmitted from the first terminal.

For example, the clock signal may comprise a positive signal at each frame interval, and no signal at all other points in time. When the phase inversion module detects a positive clock signal, the phase inversion module inverts the phase of the signal at these positive voltage points, to generate an inversion coded signal.

As described above, in examples wherein the signal is a periodic RF signal, transmitted on a carrier frequency, the phase inversion may comprise reversing the offset of the signal relative to some reference point, such as zero degrees, such that if the signal at a point in time is positive, with a certain magnitude, the signal is manipulated such that it is negative in phase at an equal magnitude. This operation may result in a positive or negative discontinuity in the signal, which may be readily detected by signal analysis equipment.

In some examples, the phase inversion may be performed relative to the phase of the signal at a point in time and not relative to an external reference point.

The discontinuity may be detected by two correlators of the PRN and PRN bar code. The output symbols may become complementary at the point of discontinuity of the phase change. In some examples, up-sampling may be employed to increase timing accuracy and precision.

In examples wherein the signal is an RF signal, and the second terminal comprises a direct radiating array, the phase inversion module may be configured to change beamforming weights of a beamforming network or beamformer by 180 degrees. The beamforming network may be digital or analog.

The phase inversion module may conduct a digital or analog phase inversion. In cases where analog phase inversion is performed, the phase inversion module may include an analog phase shifter.

FIG. 2 depicts a visualization 134 of an example signal phase inversion, according to an embodiment. The lower horizontal axis 120 depicts the periodic clock signal, wherein each vertical line 124a, 124b, 124c, depicts a periodic frame interval point (referred to collectively as frame interval points 124 and generically as frame interval point 124), each frame interval point separated by an amount of time equal to the frame interval 128. The upper horizontal axis 126 depicts the inversion coded signal 114b resulting from the execution of step 106 of the method 100 of FIG. 1. Each phase inversion point 118a, 118b, 118c may be visually identified by signal discontinuities (referred to collectively as phase inversion points 118 and generically as phase inversion point 118), with each phase inversion point 118 coinciding with a frame interval point 124. These phase inversion points 118 may be readily identified by signal analysis equipment, to extract timing information encoded into the inversion coded signal 114b at step 106.

In some examples, the system may comprise an amplitude coding module (for example, in place of phase inversion module), and instead of a phase inversion, may encode an amplitude step discontinuity into the signal using the amplitude coding module to generate an amplitude coded signal. For example, the signal may comprise a certain average amplitude. At each frame interval point, the signal amplitude may be increased by imposing a step amplitude discontinuity into the signal. The average signal amplitude after this frame interval point is greater. At the next frame interval point, the signal may be decreased by imposing a step amplitude discontinuity into the signal. The average signal amplitude after this frame interval point is now less than the previous average amplitude. The points of average amplitude change, or amplitude step discontinuities, may be detected and measured to determine signal transmission timing.

Referring again to FIG. 1, at 108, the inversion coded signal is transmitted from the second terminal to the first terminal. This step or operation may be referred to as signal loop-back, wherein a system may route a received signal back to its source without intentional processing or modification. Components of communication systems may be configured to enable a loop-back communication mode. "Loopback mode" or "loopback" as used herein refers to retransmission of a received signal without altering the signal other than with periodic phase inversions as described herein.

The second terminal may transmit the signal back to the first terminal using any available transmission scheme. In some examples, wherein the signal is an RF signal, and the second terminal comprises a direct radiating array, the RF signal may be transmitted using the direct radiating array to the first terminal. The system and methods described herein may be particularly well suited to systems comprising direct radiating arrays, as a direct radiating array inherently comprises the capacity to perform phase inversion. The signal may be transmitted along a wireless channel.

At 110, the inversion coded signal is received at the first terminal. After the completion of step 110, the first terminal may access both the originally transmitted signal and inversion coded signal and perform analysis and comparison of the originally transmitted signal and the inversion coded signal.

At 112, the signal transmission timing from the first terminal to the second terminal is determined. As described previously in reference to step 106 of method 100, signal analysis equipment present within the first terminal may readily detect phase inversion points. Phase inversion points may be detected within a fraction of a symbol, even with a low signal to noise ratio. Signal analysis equipment may measure the time difference between frame start and end points and phase inversion points. This time difference may correspond to signal transmission timing. This time quantity may be used to synchronize signal transmission between the first terminal and second terminal.

In some examples of method 100, the first terminal may measure other attributes of the signal and inversion coded signal. In some examples, the carrier frequency of both the original transmitted signal, and the received inversion coded may be detected by signal analysis equipment to determine a Doppler shift of the signal. In some examples, the determined Doppler shift of the signal may be used to determine and apply a Doppler adjustment to the signal before transmission of the adjusted signal to correct for Doppler shift.

In examples where the system comprises an amplitude coding module configured to encode an amplitude step discontinuity into the signal to encode timing information (instead of using a phase inversion), the first terminal may measure signal transmission timing by detecting signal amplitude discontinuity points.

The method 100 of FIGS. 1-2 may provide a number of advantages over existing synchronization methods. In examples wherein the signal is an RF signal, the method is agnostic to the airlink used in the system. The method 100 requires only that the second terminal include a loopback mode and signal phase inversion capability (e.g. a phase inversion module, which may include a phase shifter in an analog implementation).

In some examples, loopback capability may be assumed for any second terminal comprising an analog to digital converter (ADC), a digital to analog converter (DAC) and a digital signal processor (DSP). In such examples, the second terminal may receive the signal at an antenna and/or receive channel and pass the received analog signal to the ADC, which converts the analogue signal to a digital signal. The digital signal is passed to the DSP, which encodes phase inversions into the signal. The inversion coded signal is passed to the DAC, which converts the inversion coded signal from a digital form to an analog form. The analog form of the inversion coded signal may then be provided to a transmission channel of the second terminal. The transmission channel may transmit the analog inversion coded signal back to the first terminal.

The method advantageously embeds the remote frame timing information into the signal itself, when generating the inversion coded signal, instead of requiring a separate signal to facilitate synchronization. No digital packet counter interface is required by components of the system, as can be required for other signal synchronization methods. Method 100 may measure absolute round trip time delay using the local clock of the first terminal. Method 100 may provide for high synchronization performance, with noise values near 0 dB SNR. Method 100 may provide for high performance through the application of a long PRN code, which has been differentially decoded. The length of the PRN code may correspond to performance. For example, for a given fixed symbol rate, a longer PRN code may provide for greater performance, as the longer PRN code may comprise a longer integration time, while the use of a shorter PRN code may decrease performance, especially under noisy conditions. A chosen PRN code length is a design decision balancing various aspects of system performance, and costs, and may vary greatly from system to system, depending on the attributes of greatest importance for a given application.

Additionally, Method 100 may provide for high performance through the application of a significant up-sampling rate. The signal may be up-sampled, such that timing intervals may be detected and measured with a greater level of precision. The amount of up-sampling required may be application dependent. Greater amounts of up-sampling (e.g. 16×) may result in greater synchronization performance than lesser amounts of up-sampling (e.g. 4×). However, greater amounts of up-sampling may be resource intensive and may in some cases require upgraded hardware configurations versus lower amounts of up-sampling.

Method 100 may perform Doppler estimation in embodiments where at least one terminal is mobile. In some examples, Doppler measurement is performed in the first terminal using signal processing techniques such as correlation. Method 100 may be effectively employed in examples wherein direct sequence spread spectrum or binary phase shift keying modulation are used, as such modulation techniques provide high immunity to noise and capability to detect phase transition.

Figure 3:
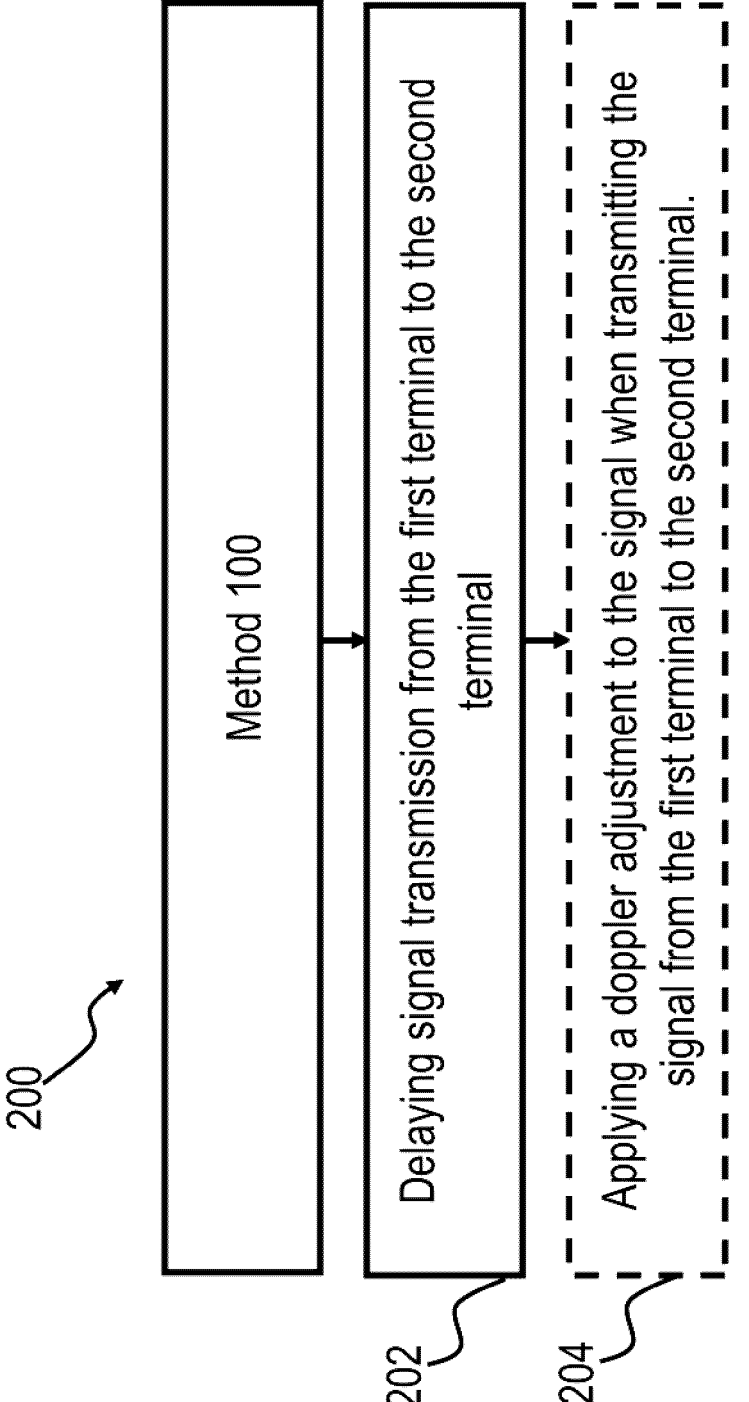
FIG. 3 is a flowchart of a method of synchronizing a signal between a first terminal and a second terminal, according to another embodiment.

Referring now to FIG. 3, pictured therein is a flowchart depicting a method 200 of synchronizing a signal between a first terminal and a second terminal, according to another embodiment. The method 200 includes all steps of method 200, and additionally includes step 202, and optionally, step 204.

At 202, the transmission of the signal from the first terminal to the second terminal is delayed. In some examples, the signal is delayed for an amount of time equal to the signal transmission timing determined at previous step 112, forming an adjusted signal 114c. The delay introduced into the signal transmission process results in the adjusted signal 114c arriving at the second terminal such that the frames of the adjusted signal 114c are temporally aligned with the frame intervals of the second terminal. After the completion of step 202, the signal transmission between the first terminal and second terminal is synchronized. The standard datalink may commence after synchronization.

At 204, in examples wherein at least one terminal is mobile, a Doppler adjustment is applied to the signal when the signal is transmitted from the first terminal to the second terminal. As described above in reference to step 112, a Doppler shift value may be determined. This Doppler shift may be used to generate a Doppler adjustment, which may be applied to the signal 114a before transmitting the adjusted signal 114c. The application of the Doppler adjustment may counteract the Doppler effect on the signal 114a during transmission.

Methods 100 and or 200 may be a synchronization step of a wireless communication system. Method 100 and or 200 may be executed upon system initialization to determine signal transmission timing for the purpose of synchronizing signal transmission between a first terminal and a second terminal. After the completion of method 100 and or 200, the signal transmission between the first terminal and the second terminal is synchronized. Standard datalink transmission over an airlink may then commence, wherein the adjusted signals 114c carrying the standard datalink are adjusted such that the first terminal and second terminal are synchronized. In a particular example, the signal transmission occurring post-synchronization is part of a calibration process whereby the operation of the second terminal is calibrated via communication between the first and second terminals and performance of calibration tasks by the first terminal. In some examples, after the synchronization process is completed, a wait period may elapse before commencing standard, synchronized transmission. The wait period may be used so that, with propagation and processing delay, the signal arrives synchronously with the second terminal frame.

Figure 4:
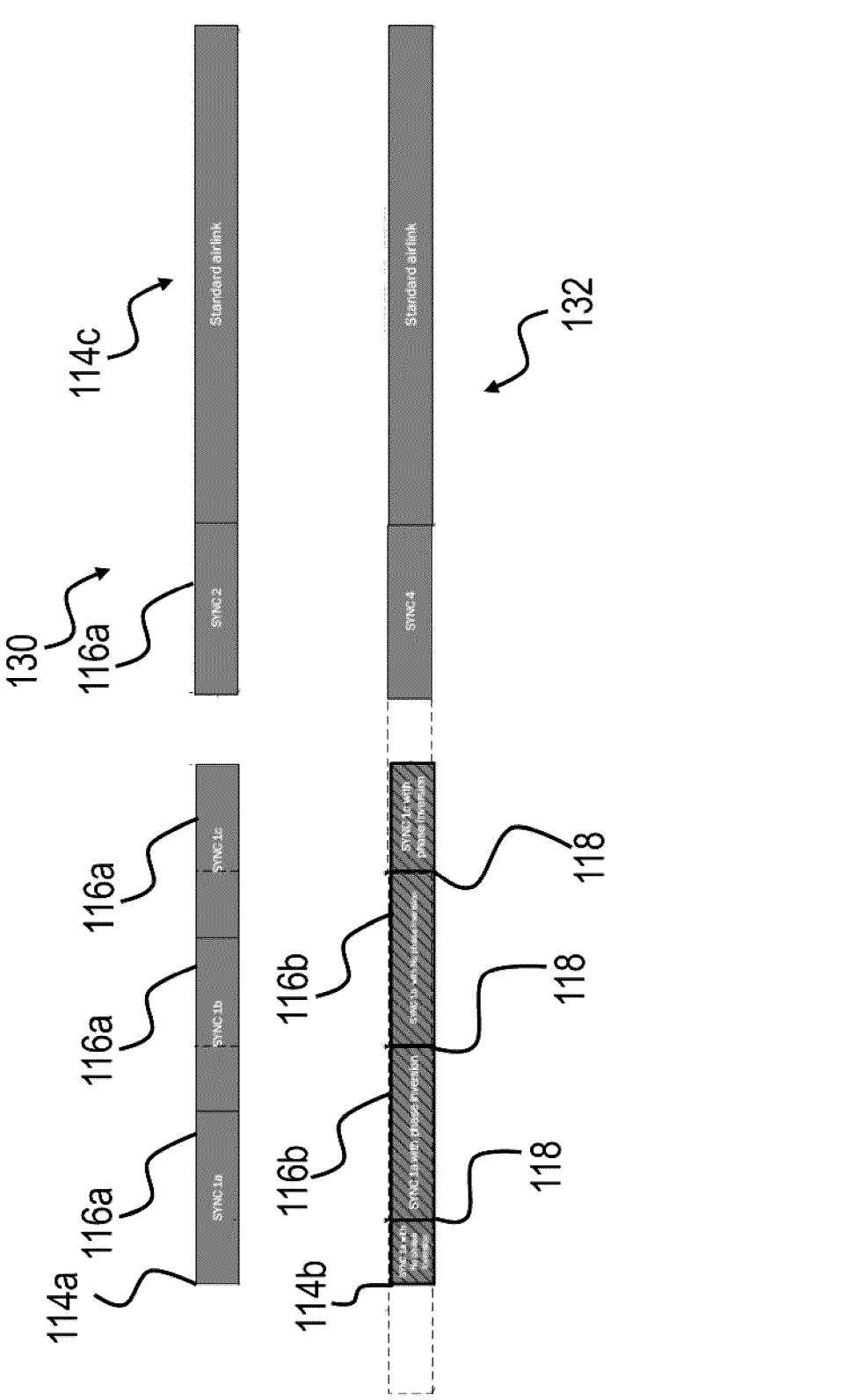
FIG. 4 is a block diagram of a signal and a corresponding inversion coded signal, according to an embodiment.

Referring now to FIG. 4, pictured therein is a block diagram detailing a signal 114a and an inversion coded signal 114b, according to an embodiment. The upper frames comprise uplink signals 130, while the lower frames comprise downlink signals 132. The signal 114a comprises a plurality of frames 116a. The inversion coded signal 114b comprises a plurality of frames 116b, and a plurality of inversion points 118. Once synchronization is completed, as described above in reference to methods 100 and or 200, the standard datalink may proceed, wherein adjusted signal 114c is transmitted.

Figure 5:
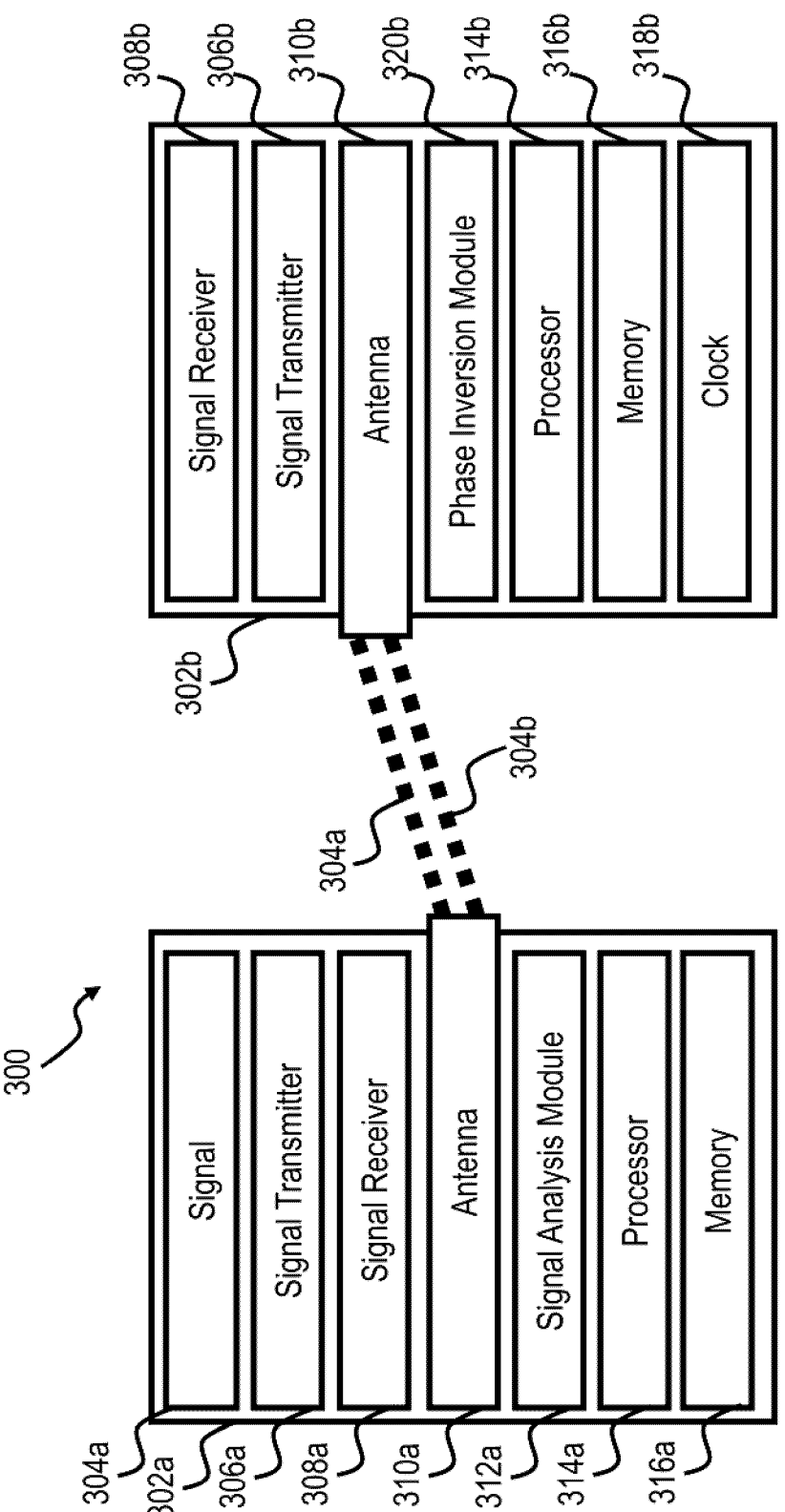
FIG. 5 is a block diagram of a system for synchronizing a signal between a first terminal and a second terminal, according to an embodiment.

Referring now to FIG. 5, pictured therein is a block diagram of a system 300 for synchronizing a wireless signal between a first terminal 302a and a second terminal 302b, according to an embodiment. Description above in reference to methods 100 and 200 applies to system 300. The system 300 described in reference to FIG. 5 may be applicable to any satellite or terrestrial digital or analog wireless communication system.

The first terminal 302a includes a signal transmitter 306a, for transmitting a signal 304a, a signal receiver 308a, an antenna 310a, a signal analysis module 312a, a processor 314a, and memory 316a. Components of first terminal 302a may be configured such that they may communicate with any or all other components of first terminal 302a. In the example of system 300, the signal 304a comprises an RF signal, however, in other embodiments, the signal 304a may comprise other forms, such as a visible light signal or a sound signal.

Signal 304a may comprise any signal known in the art that may carry information. In some examples, signal 304a is an RF transmittable signal, comprising a plurality of frames. Signal 304a may be generated internally by first terminal 302a or may be supplied to first terminal 302a from an external component. Signal 304a may take on various forms in a single embodiment, for example, signal 304a may be an RF signal while being transmitted between first terminal 302a and second terminal 302b but may be a conductive electric signal within first terminal 302a.

Signal transmitter 306a may receive signal 304a, then transmit the signal 304a to the second terminal 302b through antenna 310a. Signal transmitter 306a may be configured to enable beamforming or may be configured for operation with a direct radiating array.

Signal receiver 308a may be connected to antenna 310a. In some examples, signal receiver 308a may receive inversion coded signal 304b through antenna 310a.

Antenna 310a may be any antenna known in the art for transmitting an RF signal. In some examples, antenna 310a may comprise an array of antennas. In some examples, antenna 310a may comprise a direct radiating array antenna. In some examples, antenna 310a may be configured to enable beamforming. The beamforming may include analog beamforming or digital beamforming.

Signal analysis module 312a is configured to receive signal 304a and inversion coded signal 304b. Signal analysis module 312a may perform a number of operations on each signal 304a, 304b to analyze each signal. Signal analysis module 312a may detect phase inversion points of inversion coded signal 304b, to detect second terminal frame intervals, and therefore, signal 304a transmission time between first terminal 302a and second terminal 302b. Additionally, signal analysis module 312a may determine a carrier frequency of each signal 304a, 304b, and compare each frequency to determine a Doppler shift value.

Processor 314a and Memory 316a are configured to receive inputs and send outputs to any or all other components of first terminal 302a. Processor 314a and memory 316a may be any processor and memory types known in the art for the general purpose processing and storage of data.

The second terminal 302b comprises a signal transmitter 306b, a signal receiver 308b, an antenna 310b, a phase inversion module 320b, a clock 318b, a processor 314b, and memory 316b. Components of first terminal 302b may be configured such that they may communicate with any or all other components of first terminal 302b.

Clock 318b may comprise a piezoelectrically driven clock, an atomic clock, or any other clock known in the art that generates a consistent clock signal. Clock 318b may be configured to output a clock signal to another component of the second terminal 302b, such as phase inversion module 320b.

Phase inversion module 320b may receive signal 304a through signal receiver 308b. Phase inversion module 320b may also receive a clock signal from clock 318b. Phase inversion module 320b is configured to invert the phase of the signal 304a at clock signal points, to generate an inversion coded signal 304b, wherein clock 318b is encoded directly into the signal.

Signal transmitter 306b may receive inversion coded signal 304b from phase inversion module 320b, then transmit the inversion coded signal 304b to the first terminal 302a through antenna 310b. Signal transmitter 306b may be configured to enable beamforming or may be configured for operation with a direct radiating array. Signal transmitter 306b may transmit signals over a wireless channel.

Signal receiver 308b may be connected to antenna 310b. In some examples, signal receiver 308b may receive signal 304a through antenna 310b. Antenna 310b may be any antenna known in the art suitable for transmitting and receiving an RF signal at the second terminal 302b. For example, where second terminal 302b is on an orbiting satellite, antenna 310b may be an antenna suitable for transmitting and receiving RF signals to and from an orbiting satellite. In some examples, antenna 310a may comprise a direct radiating array antenna. In some examples, antenna 310a may be configured to enable beamforming. The beamforming may include analog beamforming or digital beamforming. In some examples, the antenna 310b may be a parabolic antenna.

Processor 314b and Memory 316b are configured to receive inputs and send outputs to any or all other components of second terminal 302b. Processor 314b and memory 316b may be any processor and memory types known in the art for the general-purpose processing and storage of data.

In the operation of system 300, first terminal 302a transmits signal 304a to second terminal 302b. Second terminal 302b receives signal 304a and performs a periodic phase inversion on the signal 304a using the phase inversion module 320b. Phase inversion module 320b receives timing data from clock 318b. Signal 304a is phase inverted at each frame interval, to produce the inversion coded signal 304b. Inversion coded signal 304b is transmitted from second terminal 302b to first terminal 302a.

Signal analysis module 312a at the first terminal 302a receives inversion coded signal 304b and may detect phase inversion points to determine the timing of the clock 318b of the second terminal 302b ("second terminal clock timing"). Second terminal 302b may be configured such that signals are expected to be received such that frame timing of the signals is temporally aligned with frame intervals of the clock 318b. Signal analysis module 312a may then measure the time between a phase inversion point and the start of the next frame or previous frame, to determine signal transmission timing. Optionally, signal analysis module 312a may measure the carrier frequency of both signal 304a and inversion coded signal 304b. The difference between the carrier frequency of the signal 304a and the inversion coded signal 304b may be deemed the Doppler shift. In such examples, at least one terminal of the base and second terminals 302a, 302b may be mobile.

First terminal 302a may apply a delay to signal 304a corresponding to the determined signal transmission timing, wherein the signal 304a arrives at second terminal 302b such that the frames of signal 304a are aligned with the clock timing of the clock 318b of second terminal 302b.

In some examples of system 300, the second terminal 302b may be on a satellite as part of a satellite-based wireless communication system. In some examples of system 300, the satellite may be an earth orbiting satellite. In other embodiments, the second terminal 302b may be a terrestrial wireless communication system.

Figure 6:
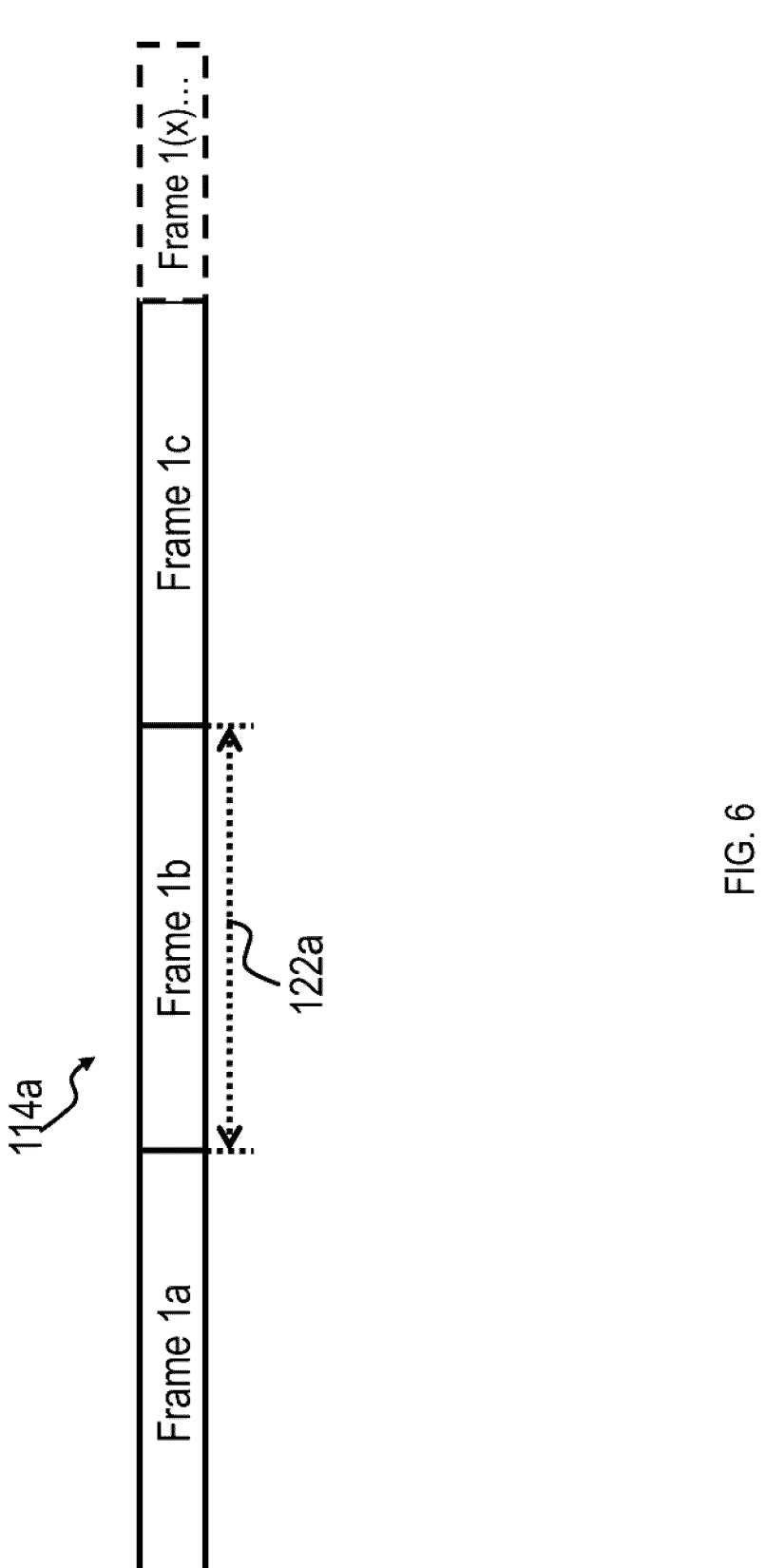
FIG. 6 is a block diagram of a signal, as may be transmitted by the system of FIG. 5.

Referring now to FIG. 6, pictured therein is a block diagram depicting the signal 114a, according to an embodiment. The signal 114a comprises a plurality of frames. Each frame may be of a fixed frame length 122a. The frame length 122a may be measured in units of time. The frame length 122a may be of a time length identical to frame interval 128, as depicted in FIG. 2. When the terminals 302a, 302b of system 300 are synchronized, adjusted signal 114c is received at the second terminal 302b such that each frame interval 128 and each frame length 122a temporally coincide, allowing the second terminal 302b to sample the adjusted signal 114c at known points in time.

Figure 7:
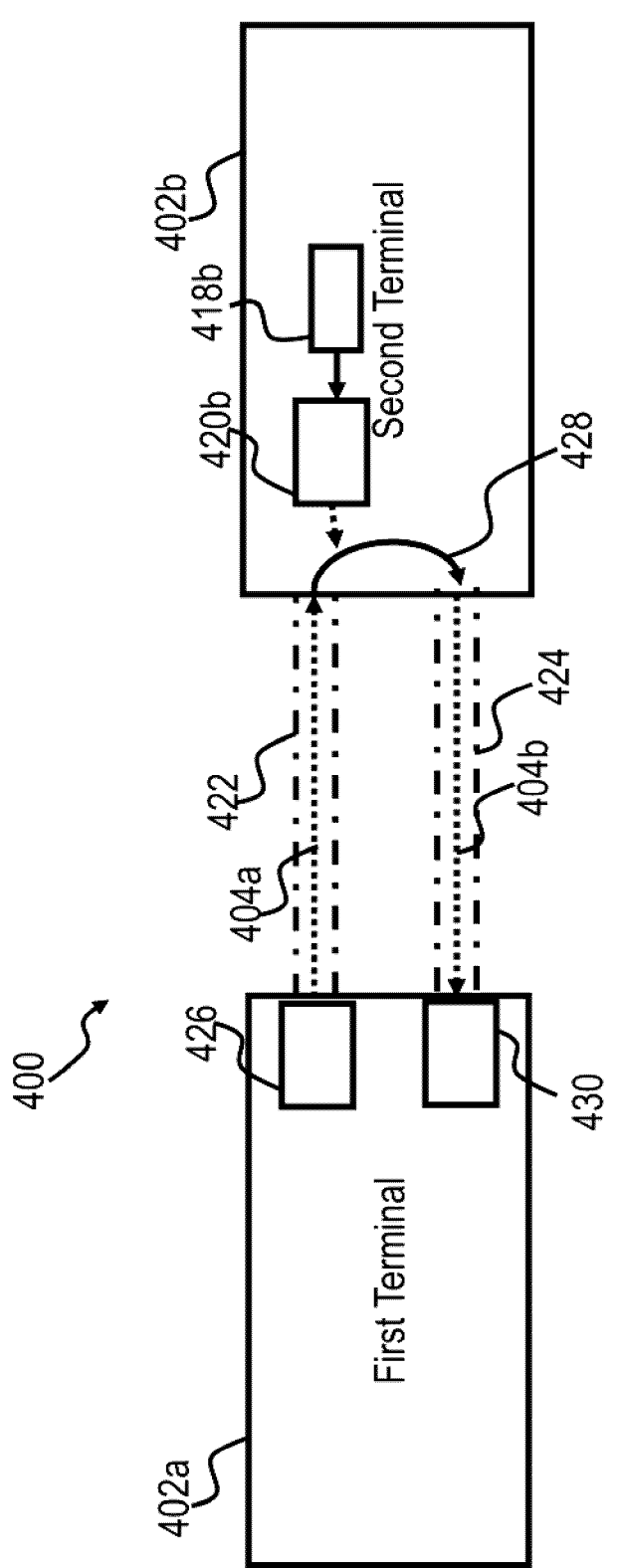
FIG. 7 is a block diagram of a system for synchronizing a signal between a first terminal and a second terminal, according to another embodiment.

Referring now to FIG. 7, shown therein is a block diagram depicting a system 400 for synchronizing a signal between two terminals, according to an embodiment. The system 400 may be the system 300 of FIG. 3.

The system 400 includes a first terminal 402a and second terminal 402b.

The first terminal 402a generates a signal 404a via a signal generation module 426.

As described above in reference to other embodiments, first terminal 402a transmits the signal 404a to second terminal 402b via a wireless channel 422. In some examples, wireless channel 422 may be referred to as the uplink wireless channel.

Second terminal 402b receives signal 404a and performs a periodic phase inversion using the phase inversion module 420b. Phase inversion module 420b receives timing data as input from clock 418b. The phase inversion module 420b inverts the phase of signal 404a at each frame interval to produce an inversion coded signal 404b. Depending on the implementation, the phase inversion module 420b may perform the signal phase inversion using digital or analog means.

The inversion coded signal 404b is transmitted from second terminal 402b to first terminal 402a via wireless channel 424. In some examples, wireless channel 424 may be referred to as the downlink channel. This operation, in some examples, may be referred to as loop-back, as described above.

Timing estimation module 430 may receive the inversion coded signal 404b and determine the signal transmission timing from the first terminal 402a to the second terminal 402b. Timing estimation module 430 may measure the time discrepancy between phase inversion points and frame beginning points. This time discrepancy corresponds to the signal transmission timing. The first terminal 402a may produce an adjusted signal (not pictured), such that when the first terminal 402a transmits the adjusted signal to the second terminal 402b, the adjusted signal is received by the second terminal 402b such that signal frames are temporally aligned with frame interval points.

Synchronizing signal timing between the first terminal 402a and second terminal 402b enables effective wireless communication between the two terminals.

While the above description provides examples of one or more apparatus, methods, or systems, it will be appreciated that other apparatus, methods, or systems may be within the scope of the claims as interpreted by one of skill in the art.

The invention claimed is:

1. A system for synchronizing signal timing of a radio frequency (RF) signal comprising a phase and a plurality of frames, the system comprising:

a first terminal comprising a signal analyzing module;

a second terminal on an orbiting satellite, the second terminal including a clock, a phase inversion module, and a direct radiating array, the clock outputting a clock signal at a frame interval;

wherein the first terminal is configured to transmit the signal to the second terminal;

wherein the second terminal is configured to receive the signal transmitted from the first terminal, periodically invert the phase of the signal at the frame interval using the phase inversion module to produce an inversion coded signal comprising at least one phase inversion point, and transmit the inversion coded signal to the first terminal using the direct radiating array; and wherein the first terminal is configured to receive the inversion coded signal and determine signal transmission timing by measuring a discrepancy between a phase inversion point and a beginning point of a next frame using the signal analyzing module.

2. The system of claim 1, wherein the direct radiating array is configured to perform analog beamforming and wherein the phase inversion module is configured to periodically invert the phase of the signal at the frame interval by adjusting beamforming weights of an analog beamforming network in the direct radiating array by 180 degrees using a phase shift.

3. The system of claim 1, wherein the direct radiating array is configured to perform digital beamforming and wherein the phase inversion module is configured to periodically invert the phase of the signal at the frame interval by digitally adjusting beamforming weights of a digital beamforming network in the direct radiating array by 180 degrees using a phase shift.

4. The system of claim 1, wherein the first terminal is further configured to transmit an adjusted signal to the second terminal, the adjusted signal being the signal with a timing adjustment applied, and wherein the timing adjustment is determined from the transmission timing of the signal.

5. The system of claim 4, wherein the timing adjustment comprises delaying the transmission of the signal by an amount of time equal to the signal transmission timing.

6. The system of claim 4, wherein the signal is transmitted from the first terminal to the second terminal for a duration of time such that at least two full frames are transmitted before transmitting an adjusted signal.

7. The system of claim 4, further comprising determining a Doppler shift between the signal and inversion coded signal and applying a Doppler adjustment factor to the adjusted signal based on the Doppler shift determination.

8. The system of claim 1, wherein each frame of the signal comprises a length, and wherein the length is equal to the frame interval.

9. A method of synchronizing signal timing between a first terminal and a second terminal, wherein the second terminal comprises a clock, the clock outputting a clock signal at a frame interval, the method comprising:

transmitting a signal from the first terminal to the second terminal, the signal comprising a phase and a plurality of frames;

receiving the signal at the second terminal;

periodically inverting the phase of the signal at the frame interval to produce an inversion coded signal comprising at least one phase inversion point;

transmitting the inversion coded signal from the second terminal to the first terminal;

receiving the inversion coded signal at the first terminal;

determining transmission timing of the signal from the first terminal to the second terminal by measuring a timing discrepancy between the at least one phase inversion point and a start time of a next frame.

10. The method of claim 9, further comprising:

transmitting an adjusted signal from the first terminal to the second terminal, the adjusted signal being the signal with a timing adjustment applied, and wherein the timing adjustment is determined from the transmission timing of the signal.

11. The method of claim 10, wherein the timing adjustment comprises delaying the transmission of the signal by an amount of time equal to the signal transmission timing.

12. The method of claim 10, wherein the signal is transmitted from the first terminal to the second terminal for a duration of time such that at least two full frames are transmitted before transmitting an adjusted signal.

13. The method of claim 9, wherein each frame of the signal comprises a length, and wherein the length is equal to the frame interval.

14. The method of claim 9, wherein the signal is a radio frequency ("RF") signal.

15. The method of claim 9, wherein the second terminal is on an orbiting satellite.

16. The method of claim 9, further comprising determining a Doppler shift between the signal and inversion coded signal and applying a Doppler adjustment factor to the signal based on the Doppler shift determination.

17. A method of signal synchronization between two communication terminals configured for wireless communication, the method comprising:

transmitting a signal from a first terminal to a second terminal, performing a phase inversion of the signal at clock timing points of the second terminal such that timing information is encoded into the signal at phase inversion points to generate a timing encoded signal, transmitting the timing encoded signal to the first terminal, extracting second terminal timing information from the received timing encoded signal using phase inversion points in the timing encoded signal, and synchronizing communication between the first and second terminals using the extracted second terminal timing information.

18. The method of claim 17, wherein the second terminal is on an orbiting satellite.

19. The method of claim 17, wherein each frame of the signal comprises a length, and wherein the length is equal to a frame interval of the signal.

* * * * *